US011785452B2

(12) United States Patent
Harley et al.

(10) Patent No.: US 11,785,452 B2
(45) Date of Patent: Oct. 10, 2023

(54) ERROR CORRECTION CODE-BASED EMBEDDING IN ADAPTIVE RATE COMMUNICATION SYSTEMS

(71) Applicant: The United States of America, as represented by the Secretary of the Navy, Arlington, VA (US)

(72) Inventors: Peter Michael Baab Harley, Annapolis, MD (US); Murali Tummala, Monterey, CA (US); John Colin Mceachen, Carmel, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 324 days.

(21) Appl. No.: 17/156,425

(22) Filed: Jan. 22, 2021

(65) Prior Publication Data

US 2021/0227384 A1    Jul. 22, 2021

Related U.S. Application Data

(60) Provisional application No. 62/964,533, filed on Jan. 22, 2020.

(51) Int. Cl.
*H04W 12/037* (2021.01)
*H04W 12/0431* (2021.01)
(Continued)

(52) U.S. Cl.
CPC ..... *H04W 12/037* (2021.01); *H03M 13/1102* (2013.01); *H03M 13/353* (2013.01);
(Continued)

(58) Field of Classification Search
CPC ... H04L 1/0002; H04L 1/0003; H04L 1/0061; H04L 63/04; H04L 27/0008;
(Continued)

(56) References Cited

U.S. PATENT DOCUMENTS 7,685,500 B2 * 3/2010 Jacobsen ............... H04L 1/0057
714/779
8,937,868 B2 * 1/2015 Kim ....................... H04L 1/0019
370/252
(Continued)

OTHER PUBLICATIONS

Cabaj K, Caviglione L, Mazurczyk W, Wendzel S, Woodward A, Zander S, (May 2018) "The new threats of information hiding: The road ahead,". IEEE IT Prof, vol. 20, pp. 31-39.
(Continued)

*Primary Examiner* — Lizbeth Torres-Diaz
(74) *Attorney, Agent, or Firm* — Naval Postgraduate School; Scott Bell (57) ABSTRACT

The invention relates to concealing information within error correction codes of adaptive rate wireless communication systems. In some embodiments, the invention includes selecting a modulation and coding scheme with a more robust error correction capacity than needed by current channel conditions; encoding a hidden message with a pre-shared key that is known by a covert transmitter and a covert receiver, and after a standard message is encoded by a transmitting station of the wireless communication systems, replacing codeword parity bits of codewords in the encoded standard message with the encoded hidden message at designated locations. Before a receiving station of the wireless communication systems decodes the encoded standard message, a covert receiver extracts the embedded hidden message from the encoded standard message, replaces bit values of the embedded hidden message with (Continued)

zero at the designated locations, and decodes the extracted hidden message with the pre-shared key.

14 Claims, 4 Drawing Sheets

(51) Int. Cl.
    *H04L 1/00*     (2006.01)
    *H04L 9/40*     (2022.01)
    *H04W 84/12*     (2009.01)
    *H03M 13/35*     (2006.01)
    *H03M 13/11*     (2006.01)

(52) U.S. Cl.
CPC .......... *H04L 1/0002* (2013.01); *H04L 1/0054* (2013.01); *H04L 1/0061* (2013.01); *H04L 63/04* (2013.01); *H04W 12/0431* (2021.01); *H04W 84/12* (2013.01)

(58) Field of Classification Search
CPC ... H04W 12/037; H04W 84/12; H04W 12/04; H04W 12/0431; G06F 21/43
See application file for complete search history.

(56) References Cited

U.S. PATENT DOCUMENTS

| | | | |
|---|---|---|---|
| 9,867,199 B1* | 1/2018 | Pawar | H04B 7/024 |
| 10,313,051 B2* | 6/2019 | Greenberg | H04L 1/0009 |
| 2006/0218459 A1* | 9/2006 | Hedberg | H03M 13/353 714/752 |
| 2014/0226819 A1* | 8/2014 | Dittrich | G06F 21/36 380/270 |
| 2021/0250117 A1* | 8/2021 | Homchaudhuri | H04L 1/08 |
| 2021/0352053 A1* | 11/2021 | Melodia | H04L 63/1475 |

OTHER PUBLICATIONS

Caviglione L, Wendzel S, and Mazurczyk W, (Nov. 2017) "The future of digital forensics: Challenges and the road ahead." IEEE Security Privacy, vol. 15, pp. 12-17.

Frikha L, Trabelsi Z, and El-Hajj W, (Aug. 2008) "Implementation of a covert channel in the 802.11 header". 2008 Int. Wireless Commun. and Mobile Computing Conference, pp. 594-599.

Grabska I, and Szczypiorski K, (Sep. 2013) "Steganography in WiMAX networks." 2013 5th Int. Congr. Ultra Modern Telecommun. and Control Syst. and Workshops (ICUMT), pp. 20-27.

Grabski S and Szczypiorski K, (May 2013) "Steganography in OFDM symbols of fast IEEE 802.11n networks." 2013 IEEE Security and Privacy Workshops, pp. 158-164.

"IEEE Standard for Information Technology-Telecommunications and information exchange between systems Local and metropolitan area networks-Specific requirements_Part 11 Wireless LAN Medium Access Control (MAC) and Physical Layer (PHY) Specifications," (Dec. 2016) IEEE Std 802.11-2016 (Revision of IEEE std 802.11-2012), pp. 3342-3368.

Kratzer C, Dittmann J, Lang A, and Kuhne T, (Sep. 2006),"WLAN steganography: A first practical review", Pro. 8th Workshop Multimedia and Security, MM&Sec '06, (New York, NY, USA), pp. 17-22, ACM.

Lampson B W, (Oct. 1973), "A note on the confinement problem", Commun ACM, vol. 16, pp. 613-615.

Mazurczyk W, and Caviglione L, (Mar. 2015), "Information hiding as a challenge for malware detection", IEEE Security Privacy, vol. 13, pp. 89-93.

Nitsche T, Cordeiro C, Flores A.B., Knightly W, Perahia E., and Widmer J C, (Dec. 2014) "IEEE 802.11ad: Directional 60 GHz communication for multi-Gigabit-per-second Wi-fi [Invited Paper]", IEEE Commun. Mag., vol. 52, pp. 132-141.

Schulz B, (2017), "White Paper: 802.11ad—WLAN at 60 GHz-solution", tech. rep., KG, Rohde & Schwarz GmbH & Co.

Subramani KS, Antonopoulos A, Abotabl AA, Nosratinia A, Makris Y, (May 2017), "INFECT: INconspicious FEC-based trojan: A hardware attack on an 802.11a/g wireless network", 2017 IEEE Int. Symp. Harware Oriented Security and Trust (HOST), pp. 90-94.

Yan X, Guan S, and Niu X (Aug. 2008), "Research on the capacity of error-correcting codes-based information hiding", 2008 Int. Conf. Intelligent Inform. Hiding and Multimedia Signal Processing, pp. 1158-1161.

Zander S, Armitage G and Branch P, (Dec. 2007), "Covert channels and countermeasures in computer network protocols [Reprinted from IEEE Communications Surveys and Tutorials]" IEEE Commun. Mag., vol. 45, pp. 136-142.

Zhao H, (Apr. 2014), "Covert channels in 802.11e wireless networks", 2014 Wireless Telecommunications Symp., pp. 1-5.

* cited by examiner

ERROR CORRECTION CODE-BASED EMBEDDING IN ADAPTIVE RATE COMMUNICATION SYSTEMS

CROSS-REFERENCE TO RELATED APPLICATIONS

This application claims the benefit of U.S. Provisional Application No. 62/964,533, filed Jan. 22, 2020, which is hereby incorporated in its entirety by reference.

BACKGROUND OF THE INVENTION

1. Field of the Invention

The present invention relates generally to methods and systems for concealing information in wireless communication systems.

2. Description of the Related Art

Information hiding techniques utilize legitimate carriers to transport hidden messages, providing users with some measure of anonymity and security. Recently there has been increased attention to the role of information hiding techniques with respect to cyber warfare and crime. The ability to perform command and control of malware, payload delivery, and recovery of desired content relies upon the development of communication paths that evade cyber defenses. Covert channels will not only obscure the content of these vital communication links, but further confound efforts by computer security and forensic professionals by making the channels difficult to detect in the first place. The term covert channel is defined as a channel that was "not intended for information transfer at all"; these channels are implemented using information-hiding techniques.

A popular technique used to carry large hidden payloads is digital media steganography. Hidden data is carried within modifications made to a cover object which are imperceptible to both unwitting users and potential eavesdroppers. A substantial weakness of this technique is that the selection of a cover object is restricted to items that can tolerate a certain measure of distortion (to include images, video, and audio). Other objects commonly found in modern networked communications, including text or executable files, cannot be utilized as the act of embedding the hidden message irreparably degrades the original content.

An alternative information hiding technique previously explored in literature involves the use of forward error correction (FEC) codes. While FEC is commonly utilized to protect covert data from interference, they have also been used to carry hidden payloads. As discussed in relevant papers, FEC is attractive for information hiding as these codes often provide more redundancy than required by channel conditions; this redundancy can be used to carry hidden data. In addition, most modern communication protocols also include retransmission mechanisms that can resend lost or corrupted data if the embedded FEC fails to correct all bit errors.

In recent years, wireless communications networks have grown to represent the majority of all Internet traffic, and there has been increased interest in the development of information hiding techniques that exploit vulnerabilities within these systems. Against this backdrop, embodiments herein describe potential information hiding opportunities associated with a modern wireless local area network (WLAN) protocol, specifically the millimeter wave (mm-Wave) Institute of Electrical and Electronics Engineers (IEEE) 802.11ad directional multi-Gigabit (DMG) standard. Specifically, the embodiments seek to leverage the legitimate mechanisms within the standard to support information hiding techniques and develop a high-throughput covert channel.

The IEEE 802.11ad DMG specification provides the medium access control and physical layer (PHY) amendments necessary to achieve extremely high data rates (up to 8 Gbps) in one of six 2.16-GHz channels [16]. IEEE 802.11ad is intended for use in high-bandwidth, short-range, line-of-sight (LOS) applications to include wireless cable replacement for high definition video, wireless peripherals and docking stations, or other traditional WLAN implementations.

Figure 1A:
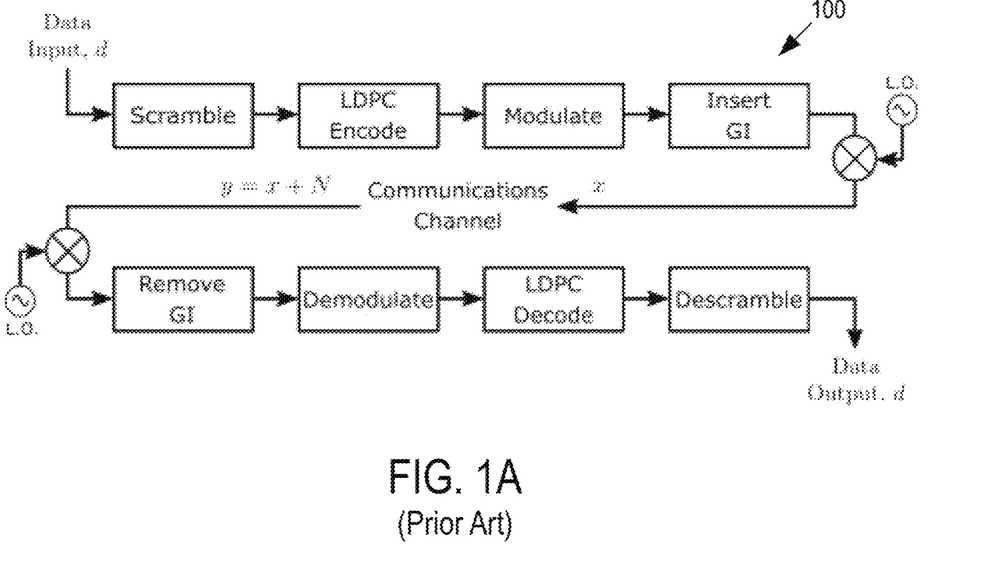
FIG. 1A shows a simplified block diagram of a typical transmit and receive process.

The standard was originally specified for three different PHY modulation modes: the control PHY, single carrier (SC) PHY and orthogonal frequency-division multiplexing (OFDM) PHY. Both the control and SC PHY are mandatory for all devices and there is also an optional low-power SC PHY defined for power-constrained devices. The OFDM PHY is now considered obsolete and therefore the focus of embodiments herein is on the SC PHY. Baseband processing at the transmitter for all PHY involves a scrambler, encoder, modulator, and insertion of guard intervals (GI). A simplified block diagram of the transmit and receive process 100 is shown in FIG. 1A.

All modern high-capacity wireless fidelity (Wi-Fi) protocols rely upon a predetermined set of modulation and coding schemes (MCS) to facilitate efficient communication across a range of channel conditions. The flexibility of MCS-based systems enable wireless networks to optimize throughput while meeting required error thresholds. Another critical aspect of MCS-based systems is the ability to perform link adaptation, where stations can dynamically select the optimal MCS for the current channel conditions. While link adaptation implementations vary, a common metric utilized to select the appropriate MCS is packet error ratio (PER). PER measures the number of packets that contain bit errors after the FEC decode process; the selection of the MCS by the link adaptation scheme is intended to maximize throughput while maintaining PER below a specified limit.

Figure 1B:
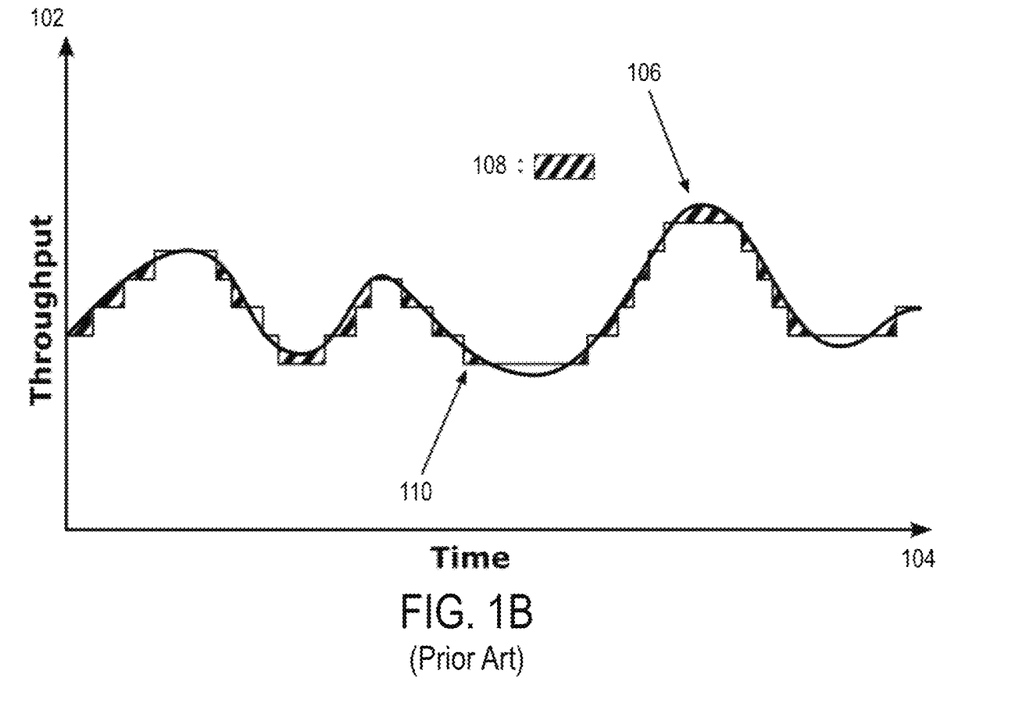
FIG. 1B shows a covert channel capacity of an MCS under normal operation.

In the IEEE 802.11-2016 standard, a revision to the original DMG specification added a number of MCS indices to the SC PHY including a 7/8-rate low-density parity-check (LDPC) code. This code rate was achieved by passing data through the existing 13/16-rate encoder and then puncturing the first 48 parity bits. Under normal operations with an MCS determined by the channel state, the capacity of a FEC-based information hiding scheme is the shaded area 108 of FIG. 1B. FIG. 1B shows the instantaneous channel capacity 106 and throughput with dynamic MCS 110.

SUMMARY OF THE INVENTION

Embodiments in accordance with the invention relate to a method and system for concealing information in wireless communication systems. In some embodiments, the method includes selecting a modulation and coding scheme with a more robust error correction capacity than needed by current channel conditions; encoding a hidden message with a pre-shared key that is known by a covert transmitter and a covert receiver; and after a standard message is encoded by a transmitting station of the wireless communication systems, replacing codeword parity bits of codewords in the encoded standard message with the encoded hidden message at designated locations. Before a receiving station of the wireless communication systems decodes the encoded standard message, a covert receiver extracts the embedded hidden message from the encoded standard message, replaces bit values of the embedded hidden message with zero at the designated locations, and decodes the extracted hidden message with the pre-shared key.

BRIEF DESCRIPTION OF THE DRAWINGS

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to concealing information in wireless communication systems.

Figure 2A:
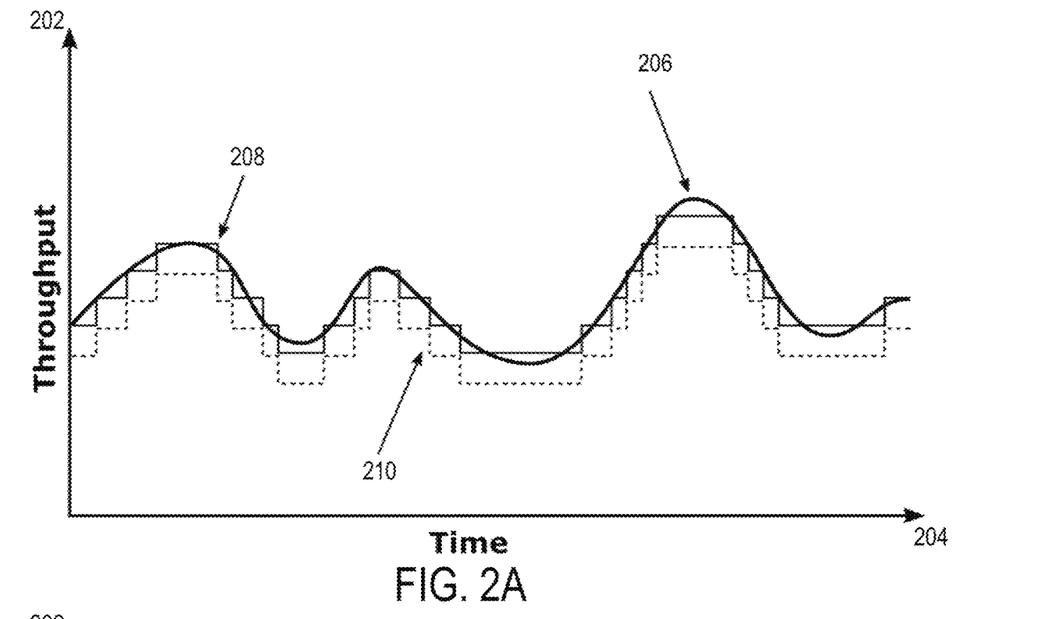
FIG. 2A shows throughput of a communication system with lower MCS intentionally selected.
Figure 2B:
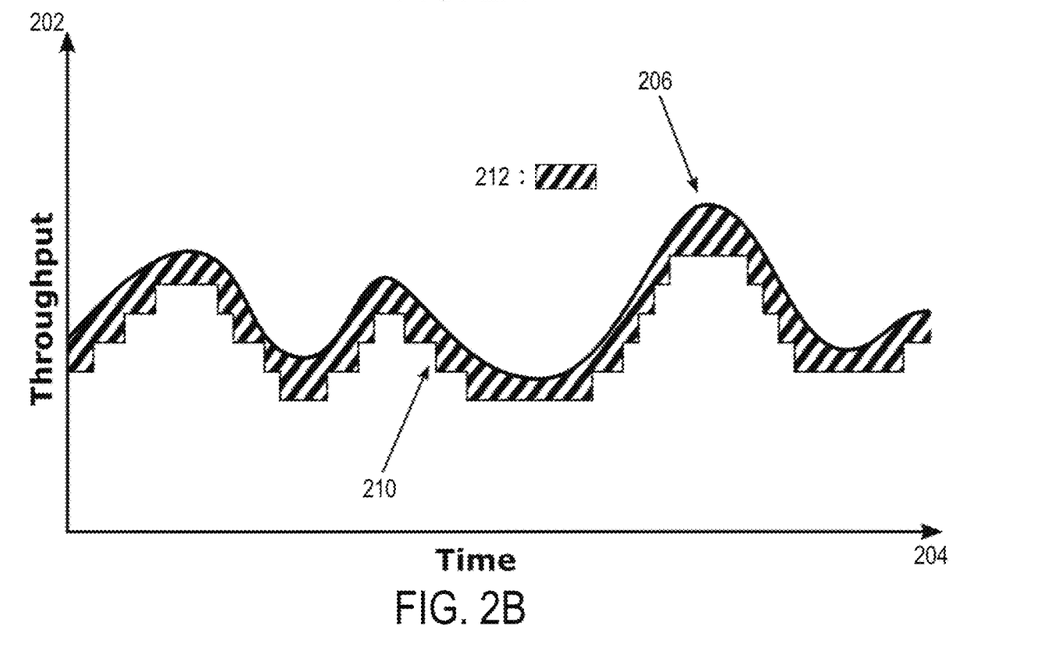
FIG. 2B shows cover channel capacity with a lower MCS selected.

It is theorized that if an SC DMG system was operating under channel conditions that supported a 7/8-rate code MCS (i.e., MCS 9.1), the 48 parity bits that would normally be punctured might be able to carry a hidden payload if an MCS with the 13/16-rate code (i.e. MCS 9) was intentionally selected. Embodiments herein described a FEC-based information hiding technique that increases covert channel capacity by leveraging the MCS construct and link adaptation functionality. The increased capacity 212 is visualized in FIGS. 2A and 2B. Attempts to increase the throughput 210 of the information hiding scheme can exceed the instantaneous channel capacity 206 and result in system data being delivered with an increased probability of error. FIG. 2A shows the change in communication channel performance resulting from the intentional selection of a lower MCS index 210; which enables increased covert channel capacity 212, shown in FIG. 2B, without causing increased error rates to the underlying data.

There are two assumptions that should be made to realize the covert channel described herein. First it is assumed that covert access had been gained to both the transmitting and receiving station to facilitate implementation of the information hiding scheme. Second, while both stations will require software, firmware, or hardware modifications, it cannot be assumed that duplex communication is possible. As a result, some of the mechanisms utilized for normal error correction and redundancy, including automatic repeat request, may not be available to support the covert channel; other methods must be used to ensure the redundancy of the hidden data.

Embodiments herein describe a forward error correction-based information hiding technique for adaptive rate wireless communication systems. Specifically, the functionality of wireless local area network modulation and coding schemes (MCS) and link adaptation mechanisms are leveraged to significantly increase covert channel throughput. Below is a detailed implementation of this technique within the IEEE 802.11ad, directional multi-Gigabit standard. Simulation results demonstrate the potential of the proposed techniques to develop reliable, high-throughput covert channels under multiple MCS rates and embedding techniques. Covert channel performance is evaluated in terms of the observed packet error ratio of the underlying communication system as well as the bit error ratio of the hidden data.

Figure 3:
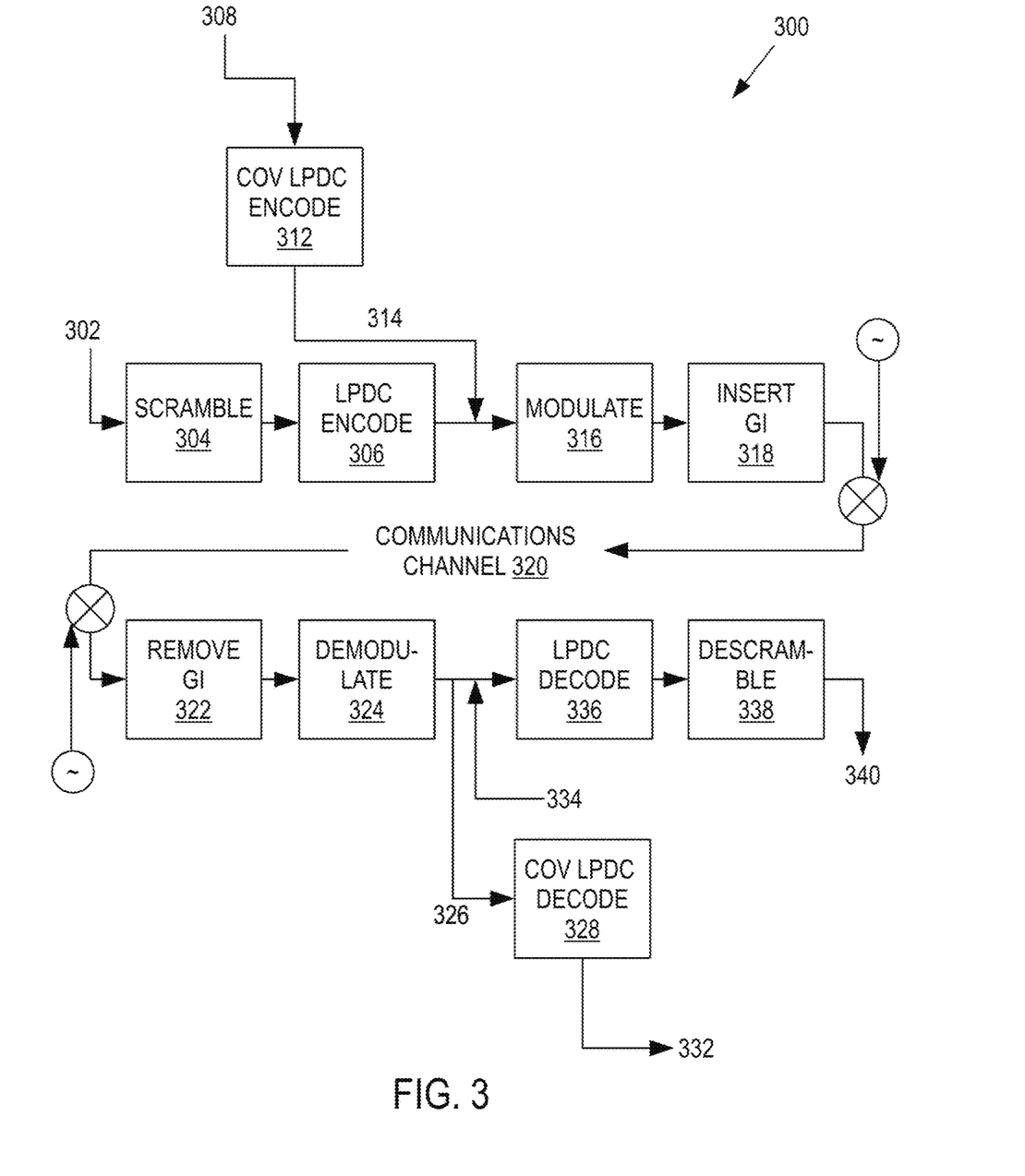
FIG. 3 shows a system workflow for a cover channel in accordance with embodiments described herein.

FIG. 3 shows a flowchart 300 for concealing information in wireless communication systems. As is the case with this and other flowcharts described herein, various embodiments may not include all of the steps described below, may include additional steps, and may sequence the steps differently. Accordingly, the specific arrangement of steps shown in FIG. 3 should not be construed as limiting the scope of concealing information in wireless communication systems.

A functionality of the proposed MCS-based information hiding technique depends upon the ability to embed hidden data within the parity bits of the FEC codeword. The amount of hidden data accommodated by this scheme can be increased by selecting a lower MCS-index as described above. Risks of detection include lower than expected system throughput given current channel conditions and the potential for an increased number of uncorrectable packet errors. Embodiments described herein minimize both risks.

Transmission of legitimate data input 302 is initially scrambled 304 and encoded 306 at a transmitting station. Data embedding 314 by a covert transmitter occurs at baseband at after the LDPC encoder 306. The embedding locations 314 are coordinated between the covert transmitter and covert receiver through a pre-shared key; analogous to the method used to implement the 7/8-rate puncturing scheme, the hidden data 308 is encoded 312 and embedded 314 in the first n parity bits of each codeword. Once the embedding process is complete, the modified LDPC codeword is passed to the modulator 316 before completing the rest of the transmit process (blocks 318-324).

At the destination, the hidden message is recovered by the covert receiver at 326 after demodulation 324. The output of the receiving station demodulator 324 are log-likelihood ratio (LLR) values 326; LLR values 326 represent both a bit value and a confidence level. After decoding 328 and extraction 332 of the embedded message, v̂, the bit positions that carried the hidden data are assigned a value of 0 before being sent to the LDPC decoder at 334 by the covert receiver. In the IEEE Standard it specifies that for punctured codes, LLR values of 0 are used at the decoder 336 to prevent the stuffed bits from introducing additional error; this same principle is leveraged to prevent the LLR values of the embedded hidden data from corrupting the legitimate packet payload. The legitimate packet payload is then descrambled 338 by the receiving station to obtain the legitimate data output 340.

Experimental trials of this proposed technique were conducted in MATLAB. The simulation was adapted from a MATLAB-developed script to measure PER; embedding and extraction of the hidden message required modifications to existing encode and decode functions used within the MATLAB WLAN Toolbox. The performance of the proposed technique was assessed by measuring the PER of the underlying communication system as well as the bit error ratio (BER) of the hidden data. PER identified the number of uncorrectable packet errors experienced at a specified channel condition and embedding rate; BER provided an estimate of expected errors in the received hidden data. As noted above, it was not assumed that duplex communication would be available in the covert channel and therefore was highly desirable to minimize the BER of the received hidden data.

The simulation was based around the transmission of a single packet with a 4096 octet PHY service data unit (PSDU). This PSDU length was selected based on criteria outlined in the IEEE Standard, which specified that the PER for each SC MCS index be no more than 1% given a PSDU length of 4096 octets. Additive white Gaussian noise (AWGN) was utilized to simulate interference in the channel. A consistent seed value was used for AWGN generation to ensure the noise environment remained consistent, with the only variable being the amount of hidden data embedded per codeword. While only a single packet was sent between the transmitting and receiving stations, these trials were completed multiple times to develop an accurate representation for the PER and BER at each specified signal-to-noise ratio (SNR) value; up to 10000 trials were conducted at each SNR value to evaluate MCS and embedding combinations.

The first series of MATLAB simulations served as a proof of concept of the general information hiding technique and were designed to address three main objectives. First, could a hidden message, m, be successfully embedded and extracted from a designated block of parity bits. Second, determine the upper limit of embedding, measured in bits-per-codeword, which would result in a noticeable performance degradation to the underlying overt communication system. Finally, could the received hidden message, m̂ be reliably estimated given the presence of channel noise. Initial simulations using MCS 9 were conducted under channel-conditions that would support MCS 9.1. The simulated transmitter replaced the first 48 parity bits of each 13/16-rate LDPC codeword with hidden data; the hidden data was not FEC protected. Additional trials were then conducted to determine the behavior of the covert channel and underlying communication system at different levels of embedding. The capacity of the system is impacted by this technique; when MCS 9 is selected in lieu of MCS 9.1, the maximum throughput is reduced from 2695 Mbps to 2502.5 Mbps. The results from various embedding rate trials were considered where the PER for the embedding rates is compared to that of the baseline MCS index; as expected the PER of MCS 9, at an embedding rate of 48 bits-per-codeword, is equivalent to that of baseline MCS 9.1. The embedded data during these initial trials was uncoded and therefore did not benefit from any error correction. As a result, the BER of the received hidden data, A, was consistent with the probability of bit error of uncoded quadrature phase-shift keying (QPSK):

$$P_b = Q\left(\sqrt{\frac{2E_b}{N_o}}\right), \quad (1)$$

where $E_b$ is the energy per user data bit, and $N_o$ is the noise spectral density.

The performance characteristics of the covert channel was relatively predictable when subjected to varying levels of embedding activity. The PER of the underlying communication system increased up to the limit of 48 bits-per-codeword, with embedding rates of 24 bits-per-codeword requiring a lower SNR to achieve a given PER than the 36 bits-per-codeword embedding rate, but a higher SNR than the 12 bits-per-codeword rate.

Simulations were then conducted for the IEEE 802.11ad MCS indices that utilized QPSK modulation (MCS 6-9.1); embedding capacity estimates are displayed below in TABLE I. The maximum number of bits-per-codeword for each 4096 octet PSDU was determined experimentally for each MCS. These results were used to calculate a ratio for embedding capacity and then multiplied by the data rates published in the IEEE Standard to estimate the covert channel throughput at each MCS.

TABLE I

| MCS Dictated by Channel Conditions | MCS Used by Embedding Algorithm | Coding Scheme | Max Embedding per CW |
|---|---|---|---|
| MCS 7 | MCS 6 | LDPC (1/2) | 92 bits |
| MCS 8 | MCS 7 | LDPC (5/8) | 85 bits |
| MCS 9 | MCS 8 | LDPC (3/4) | 48 bits |
| MCS 9.1 | MCS 9 | LDPC (13/16) | 48 bits |

| Embedded Bits per 4096 octet PSDU | Embedded Bits as % of Data Rate | Est. Covert Channel Throughput |
|---|---|---|
| 9016 bits | 27.51% | 423.73 Mb/s |
| 6715 bits | 20.49% | 394.48 Mb/s |
| 3168 bits | 9.67% | 223.33 Mb/s |
| 2928 bits | 8.94% | 223.46 Mb/s |

Although the lack of FEC in these trials maximized the embedding capacity of the information hiding technique, the relatively high BER would have made maintaining reliable covert communications difficult.

After the initial trials, LDPC codes from the IEEE 802.11ad specification were applied to the covert channel by parsing the hidden message into codewords. While the FEC codes utilized for this task were identical to those defined in the IEEE Standard, rate-selection was influenced by the observed channel condition and not necessarily the diminished code-rate utilized for the underlying communication channel. Based on the maximum embedding rates determined in the initial trials, it was necessary to calculate the number of FEC-protected hidden message bits, K, that could be embedded in each PSDU. First, the number of LDPC codewords in each PSDU, $N_{CW}$, was calculated according to the IEEE standard:

$$N_{CW} = \left\lceil \frac{8\rho L_P}{L_{CW} R_C} \right\rceil, \quad (2)$$

where $L_P$ is the length of the PSDU (in octets). The remaining variables are all dependent on the selected MCS, with $L_{CW}$ being the length of the LDPC codeword, $R_C$ being the LDPC code rate, and p being the repetition factor of the code.

In order to determine the amount of FEC-protected hidden data that can be embedded into a given PSDU, it is then necessary to determine the amount of data in each LDPC codeword used to carry the hidden message, $D_{ECW}$, where $$D_{ECW} = L_{ECW} R_{EC}, \quad (3)$$

given the length of the embedded data codeword, $L_{ECW}$, and the rate of the FEC code used to protect the hidden message, $R_{EC}$. Using the results from (1) and (2), it is possible to determine, K, the number of FEC-protected hidden message bits that can be embedded given the maximum number of embedded bits-per-PSDU codeword, n:

$$K = D_{ECW} \left\lfloor \frac{nN_{CW}}{L_{ECW}} \right\rfloor. \tag{4}$$

Utilizing FEC to protect the hidden data reduced the capacity of the information hiding scheme. Capacity was lost due to the need to embed FEC parity bits and the fact that only complete hidden message FEC codewords could be embedded in the PSDU. For trials at MCS 9, the maximum embedding capacity was 48 bits-per-codeword during the initial trials, or 2928 bits-per-PSDU. With FEC applied, only four, 624-bit codewords could be embedded, leaving 240 bits unaltered. The use of FEC in MCS 9 limited the capacity of each 4096 octet PSDU to 2184 embedded bits. Although capacity was reduced, FEC significantly improved the hidden data BER. The SC DMG specification calls for a minimum PER of $10^{-2}$, or 1% (IEEE Standard); a 1% PER is achieved at an SNR of approximately 8.6 dB. At 8.6 dB the BER for the FEC-protected hidden data is approximately $7.8 \times 10^{-7}$. As before, trials were then conducted for all QPSK-based MCS with embedding capacity estimates provided below in TABLE II.

TABLE II

| MCS Dictated by Channel Conditions | MCS Used by Embedding Algorithm | Coding Utilized for Overt Data | Coding Utilized for Embedded Data |
|---|---|---|---|
| MCS 7 | MCS 6 | LDPC (1/2) | LDPC (5/8) |
| MCS 8 | MCS 7 | LDPC (5/8) | LDPC (3/4) |
| MCS 9 | MCS 8 | LDPC (3/4) | LDPC (13/16) |
| MCS 9.1 | MCS 9 | LDPC (13/16) | LDPC (7/8) |
| Embedded Bits per 4096 octet PSDU | Embedded Bits as % of Data Rate | Est. Covert Channel Throughput | |
| 5460 bits | 16.67% | 256.60 Mb/s | |
| 4536 bits | 13.84% | 266.47 Mb/s | |
| 2184 bits | 6.67% | 153.96 Mb/s | |
| 2184 bits | 6.67% | 166.79 Mb/s | |

Figure 4A:
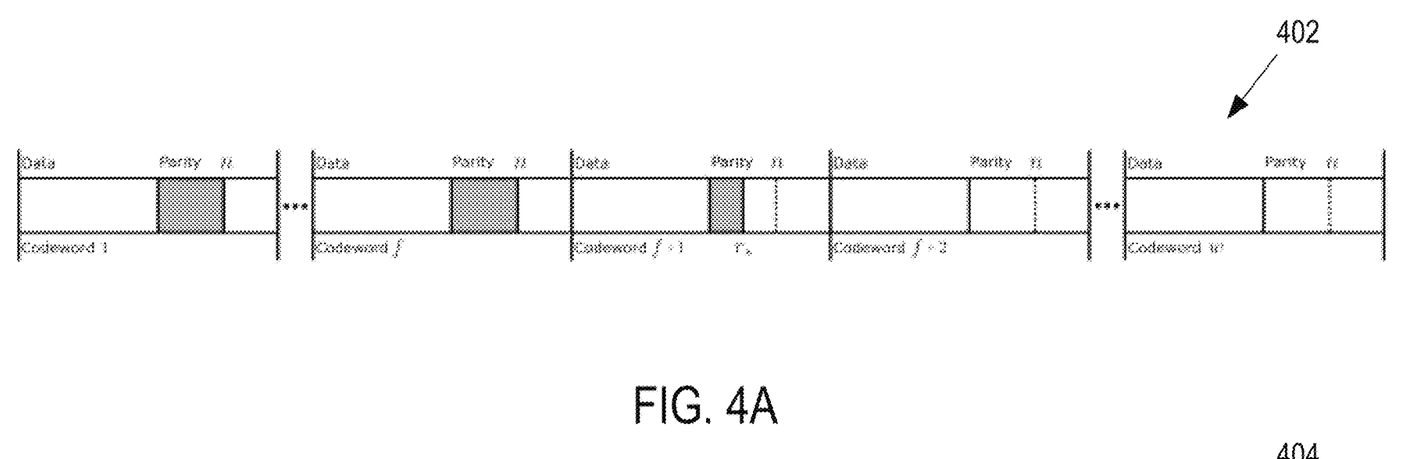
FIG. 4A shows an FEC-protected hidden message using a standard embedding technique.

Finally, a modified embedding technique was developed with the aim of reducing the distortion on the underlying communications channel without sacrificing the throughput of the covert channel. In the original application of FEC, the encoded embedded message bits were inserted into the parity bits such that the full n bit embedding capacity was utilized in the first f codewords, before embedding the remainder $r_s$ bits of hidden data in the codeword in position (f+1). A representation 402 of this method is shown in FIG. 4A with the number of fully embedded codewords, f; calculated as:

$$f = \left\lfloor \frac{T}{n} \right\rfloor, \tag{5}$$

where T is the total number of bits to be embedded. The number of bits embedded in the final codeword that contains hidden data, $r_s$, is determined using the following formula:

$$r_s = T - nf = T - n \left\lfloor \frac{T}{n} \right\rfloor. \tag{6}$$

Since the total number of parity bit locations available for embedding was greater than the number of bits being embedded, this method resulted in some legitimate codewords having all n parity bits embedded, while others carried 0 embedded bits. Since codewords that were fully embedded are more likely to experience an uncorrectable error, and that an uncorrectable error in any codeword would result in a packet error, an alternative embedding process was developed.

Figure 4B:
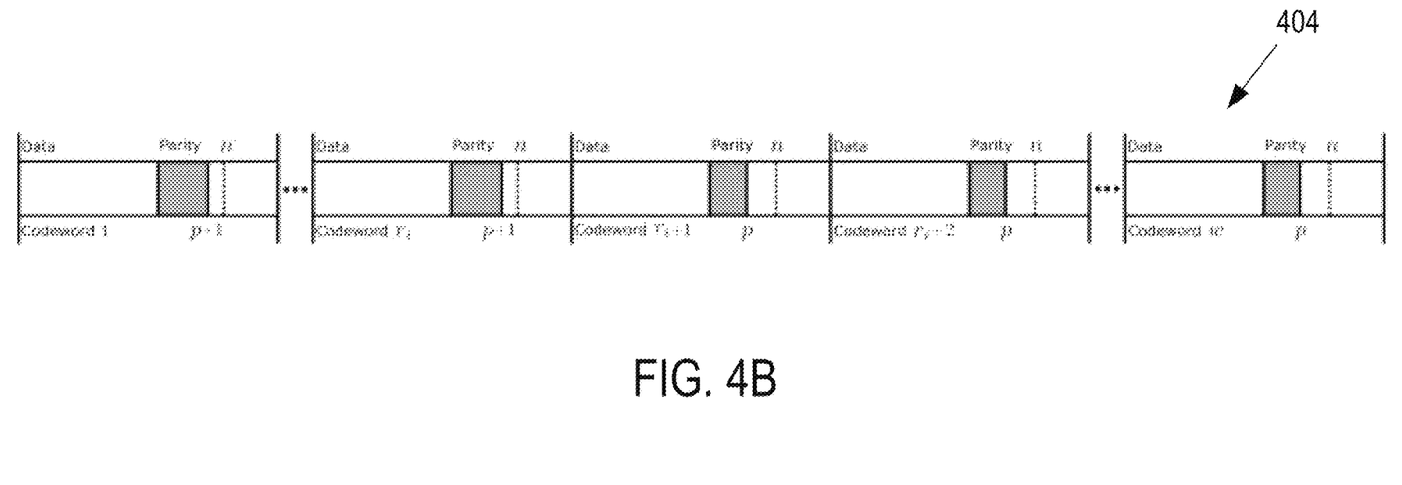
FIG. 4B shows an FEC-protected hidden message using embedding technique according to embodiments described herein.

Embodiments herein can utilize a process similar to interleaving where the hidden data is distributed equally across all $N_{CW}$ codewords. This method 404 is illustrated in FIG. 4B where the total number of codewords w, is equal to $N_{CW}$. Every codeword was embedded with a minimum of p bits:

$$p = \left\lfloor \frac{T}{w} \right\rfloor, \tag{7}$$

where T remains the total number of bits being embedded. While all codewords contain at least p-bits, the first $r_i$ codewords will contain (p+1) bits; $r_i$ is calculated by:

$$r_i = T - wp = T - w \left\lfloor \frac{T}{w} \right\rfloor, \tag{8}$$

The final series of experimental trials were conducted utilizing this interleaving technique. While the modification did not result in an increase in embedding capacity, it did consistently reduce the impact of the embedding on the underlying communication system. This improvement allows for 2184 message bits to be embedded in each 4096 octet PSDU with a 0.25 dB reduction in the required SNR. The embedded data BER for the interleaved case remains unchanged from the standard FEC implementation.

This improved performance persists across the previously considered MCS index values that utilize QPSK modulation (MCS 6-9.1). A summary of the SNR performance of this final iteration, along with the associated BER for the embedded data is shown below in TABLE III.

TABLE III

| MCS Dictated by Channel Conditions | MSC Used by Embedding Algorithm | SNR at 1% PER with MCS Dictated by Channel Conditions |
|---|---|---|
| MCS 7 | MCS 6 | 5.07 dB |
| MCS 8 | MCS 7 | 6.41 dB |
| MCS 9 | MCS 8 | 7.47 dB |
| MCS 9.1 | MCS 9 | 8.61 dB |
| SNR at 1% PER with Interleaved Embedding | Embedded Bits per 4096 octet PSDU | Embedded Data BER (at 1% PER) |
| 4.91 dB | 5460 bits | $1.3 \times 10^{-6}$ |
| 6.26 dB | 4536 bits | $5.4 \times 10^{-6}$ |
| 7.21 dB | 2184 bits | $4.1 \times 10^{-6}$ |
| 8.31 dB | 2184 bits | $7.8 \times 10^{-7}$ |

Embodiments herein provide a high-throughput covert channel, more than 150 Mbps, that reliably delivers a hidden payload without significantly increasing the errors observed within the underlying communications system. While this detailed description focuses on IEEE 802.11ad, leveraging MCS selection to increase covert channel capacity is also applicable to other adaptive rate communication protocols.

As noted in the initial simulations, the behavior of the information hiding technique was predictable when subjected to varying levels of embedding. This characteristic may allow the use of variable rate embedding without decrementing the MCS; by sensing the channel and determining if the channel state exceeds the minimum requirements of the current MCS index, embedding rates could be dynamically selected to maximize covert channel capacity while minimizing distortion.

The invention may be implemented on virtually any type of computer regardless of the platform being used. For example, a computer system can include a processor, associated memory, a storage device, and numerous other elements and functionalities typical of today's computers. The computer may also include input means, such as mixed reality controllers or a keyboard and a mouse, and output means, such as a display or monitor. The computer system may be connected to a local area network (LAN) or a wide area network (e.g., the Internet) via a network interface connection. Those skilled in the art will appreciate that these input and output means may take other forms.

Further, those skilled in the art will appreciate that one or more elements of the computer system may be located at a remote location and connected to the other elements over a network. Further, the invention may be implemented on a distributed system having several nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method for concealing information within error correction codes of adaptive rate wireless communication systems, the method comprising:
   selecting a modulation and coding scheme with a more robust error correction capacity than needed by current channel conditions to increase a covert channel capacity of wireless communication systems;
   encoding a hidden message with a pre-shared key that is known by a covert transmitter and a covert receiver; and
   after a standard message is encoded by a transmitting station of the wireless communication systems, replacing codeword parity bits of codewords in the encoded standard message with the encoded hidden message at designated locations;
   wherein before a receiving station of the wireless communication systems decodes the encoded standard message, a covert receiver:
   extracts the embedded hidden message from the encoded standard message;
   replaces bit values of the embedded hidden message with zero at the designated locations; and
   decodes the extracted hidden message with the pre-shared key.

2. The method of claim 1, wherein the codeword parity bits are a first n parity bits of each codeword of the encoded standard message.

3. The method of claim 2, wherein the bit values are log-likelihood ratio values.

4. The method of claim 2, wherein the codewords are forward error correction codewords.

5. The method of claim 1, wherein a parity-check code of the transmitting station is a low-density parity-check code.

6. The method of claim 1, wherein the codeword parity bits for each codeword is a minimum of p bits according to:

$$p = \left\lfloor \frac{T}{w} \right\rfloor,$$

wherein T is a total number of bits being embedded in the standard message and w is a total count of the codewords in the standard message, and
wherein each codeword does not include an uncorrectable error.

7. The method of claim 1, wherein the adaptive rate wireless communication systems support a 802.11ad protocol.

8. A non-transitory computer-readable medium comprising executable instructions for causing a computer processor to:
   selecting a modulation and coding scheme with a more robust error correction capacity than needed by current channel conditions to increase a covert channel capacity of wireless communication systems;
   encode a hidden message with a pre-shared key that is known by a covert transmitter and a covert receiver; and
   after a standard message is encoded by a transmitting station of the wireless communication systems, replace codeword parity bits of codewords in the encoded standard message with the encoded hidden message at designated locations;
   wherein before a receiving station of the wireless communication systems decodes the encoded standard message, a covert receiver:
   extracts the embedded hidden message from the encoded standard message;
   replaces bit values of the embedded hidden message with zero at the designated locations; and
   decodes the extracted hidden message with the pre-shared key.

9. The non-transitory computer-readable medium of claim 8, wherein the codeword parity bits are a first n parity bits of each codeword of the encoded standard message.

10. The non-transitory computer-readable medium of claim 9, wherein the bit values are log-likelihood ratio values.

11. The non-transitory computer-readable medium of claim 9, wherein the codewords are forward error correction codewords.

12. The non-transitory computer-readable medium of claim 8, wherein a parity-check code of the transmitting station is a low-density parity-check code.

13. The non-transitory computer-readable medium of claim 8, wherein the codeword parity bits for each codeword is a minimum of p bits according to:

$$p = \left\lfloor \frac{T}{w} \right\rfloor,$$

wherein T is a total number of bits being embedded in the standard message and w is a total count of the codewords in the standard message, and wherein each codeword does not include an uncorrectable error.

14. The non-transitory computer-readable medium of claim 8, wherein the adaptive rate wireless communication systems support a 802.11ad protocol.

* * * * *